United States Patent [19]
Canale et al.

[11] 3,892,942
[45] July 1, 1975

[54] SEMI-AUTOMATIC SPOT-WELDING APPARATUS

[75] Inventors: Giacomino Canale; Pietro Dessy, both of Chiavary, Italy

[73] Assignee: Engen Buchel, Vaduz, Liechtenstein

[22] Filed: Sept. 13, 1972

[21] Appl. No.: 288,534

[30] Foreign Application Priority Data
Sept. 15, 1971 Italy................................. 12918/71

[52] U.S. Cl. ............................................. 219/127
[51] Int. Cl. .............................................. B23k 9/00
[58] Field of Search ............ 219/127, 97, 98, 131 F

[56] References Cited
UNITED STATES PATENTS
2,817,003  12/1957  Dusek............................ 219/127 X
2,898,445  8/1959  Slezak............................... 219/127
3,621,184  11/1971  Mieville........................... 219/127

Primary Examiner—C. L. Albritton
Attorney, Agent, or Firm—Jacob L. Kollin

[57] ABSTRACT

A semi-automatic arc-welding apparatus. The device is shaped as a pistol. The ark is ignited in a closed chamber. The electrode is automatically moved forward to the same extent as it is decreased in length during the welding operation. The device has a hollow part in which is mounted an asbestos disk with a central bore for guiding and supporting the electrode. The closed chamber in which the electrode is ignited is shaped as a cylinder and prevents the light caused by welding from striking the eyes of the welder.

2 Claims, 3 Drawing Figures

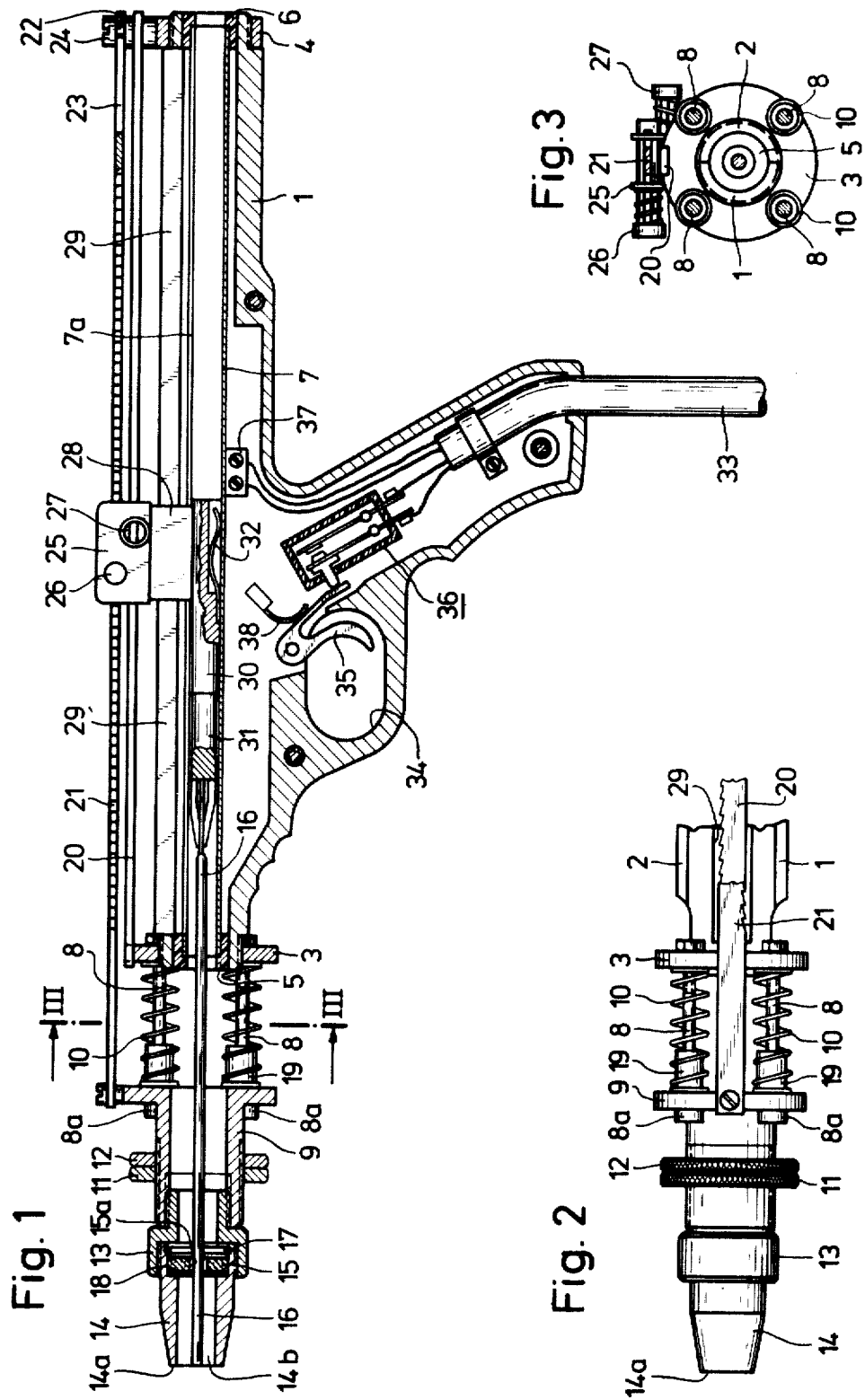

SEMI-AUTOMATIC SPOT-WELDING APPARATUS

The subject matter of the invention is a semi-automatic spot-welding apparatus which for example operates advantageously together with a spot electric-arc welding device according to the Italian Patent No. 915,649.

The main object of the invention is to provide a semi-automatic spot-welding apparatus which has the form of a pistol and can therefore be used on all sides, also on the end planes, for the objects to be welded, in that the arc is ignited in a closed chamber and in that the electrode is automatically moved forwards to the same extent as it decreases in length during the welding operation.

According to the invention, a semi-automatic spot-welding apparatus is therefore proposed, which is characterised in that the welding apparatus has the form of a pistol, in that the welding head consisting of copper exhibits in its rear hollow part an asbestos disk with a central bore for guiding through and supporting the electrode, and in that the arc is ignited in a closed cylindrical chamber in the welding head so that rays caused by spot-welding cannot appear outside.

It is also proposed in accordance with the invention that the welding head held by a flange can be moved on four threaded bolts, which are seated firmly on a disk joining the front end of the case halves, and by way of interposed pressure springs, that the disk and the ring holding together the rear ends of the case halves carry a rack having saw-blade serrations, and that, parallel above it, there is a second rack having oppositely directed teeth on the other end plane, the front end of which is joined to the flange and which exhibits at the rear a longitudinal slot for a support and guide pin seated firmly on the ring.

It is also proposed in accordance with the invention that along the racks a U-shaped driver can be moved which has catches slotted on the inside for the purpose of alternate engagement with the racks, and that the flange bears an adjustable knurled nut which serves as a stop for the heads of the threaded bolts so that the electrode is automatically moved to the same extent as it decreases in length at every spot weld.

The semi-automatic spot-welding pistol according to the invention enables the use of normal welding electrodes and, in contrast to the customary electrode holders with a great current load, it permits iron, steel, rolled or sectional metals to be welded without the use of a tail centre or counter-pressure. Even bodies consisting of aluminium can be welded without gas being used. The welding time for one spot weld amounts to one to three seconds, depending on the thickness of the objects to be welded. A minimum amperage of 20 to 40 A is required for welding sheet metals and sections of low mass, whereas an amperage of more than 100 A is needed for such materials of greater thickness (10 mm or more).

Further features of the invention are to be found in the following description and drawing.

The essence of the invention is illustrated by way of example in the drawing, in which FIG. 1 is a longitudinal section, partly broken open;
FIG. 2 shows a top view of the front part of the pistol and
FIG. 3 is a section along the plane III—III according to FIG. 1.

A case, which consists for example of an aluminium casting and has the shape of a pistol, exhibits two symmetrical halves 1, 2, the front ends of which are held together by a disk 3 furnished with a thread and the rear ends of which are held together by a ring 4 which can be screwed on. The disk 3 and ring 4 exhibit on the inside insulating rings 5, 6 of plastic or the like for the purpose of supporting a brass tube 7 having a longitudinal slot 7a.

Four threaded bolts 8 for a sleeve 9 are seated firmly on the disk 3. Pressure springs 10, by means of which the distance between the sleeve and disk can be varied, are seated on the shaft of the threaded bolts between the disk and sleeve. A guide bush 19 for the threaded bolt shaft is respectively arranged in the flange of the sleeve. The sleeve 9 has a female thread and a male thread. On the latter there are two adjustable knurled nuts 11, 12, one (12) of them serving as a stop for the heads 8a of the threaded bolts, whereas the knurled nut 11 locks the knurled nut 12.

In the female thread of sleeve 9 there is a sleeve 13 having a female thread for a head 14 consisting of copper. Said head 14 exhibits on the inside an asbestos disk 15 with a central bore 15a for pushing through and guiding the electrode 16. The asbestos disk is held by a snap ring 17 and a stop 18 provided in the inside of the head. The front part of the head tapers on the outside and ends at a plane annular surface 14a, whereas it exhibits a cylindrical chamber 14b on the inside.

A rack 20 having a saw profile is mounted firmly on the disk 13 and threaded ring 6. Above it at a parallel distance there is a second rack 21 having an oppositely directed saw profile (FIG. 2), said rack 21 being connected firmly at its front end to the flange of sleeve 9. The rear end rests, a spacing ring 22 being placed in between, on the rack 20 and has here a longitudinal slot 23 in which engages a support and guide pin 24 seated on the threaded ring 4. Hence, the sleeve 9 can be moved towards the disk 3.

Along the racks 20, 21 slides a U-shaped driver 25 which possesses spring-mounted catches 26 slotted on the inside for the purpose of engagement with the racks and which carries on its underside a plastic block 28 being able to slide in a longitudinal recess 29 in the two case halves 1, 2. At the bottom the plastic block bears a brass pin 30 which can be moved by pin 7a of the brass tube 7 in a closely adjacent manner in said tube 7 and which carries an electrode holder 31 at its front end. The front of said holder is designed in the form of claws to hold the end of the electrode tightly. The brass pin is furnished with a contact spring 32 in order to vouch for secure contact with the brass tube 7. In the handle part of the pistol-like case halves there is a recess 34 into which projects a two-arm trigger 35 with one of its arms, whereas a leaf spring 38 rests on its other arm. Said arm can operate a relay 36.

The electric part of the welding pistol is not the subject matter of the invention. Nevertheless, it is to be outlined as follows. From the electric-arc spot-welding device run in a jacket (33) two thin wires to relay 36, and a cable of suitable cross section to the terminal 37 which is fastened to the brass tube 7.

The second high-power pole is joined by an appropriate clamp to the body to be spot-welded. It therefore does not belong to the welding pistol.

The mode of operation:

The feed of the head 14 is first of all so adjusted by the knurled nut 12 that the electrode consumption is sufficient for one spot weld. In order to weld two 1-mm thick sheets for example, it is adequate to adjust the feed for two teeth along the rack. A correspondingly greater feed has to be chosen for sheets of greater thickness.

The head 14 of the welding pistol is then placed on the point to be welded, the trigger 35 is released and power is thus transmitted to the electrode 16. The pistol body 1, 2 is pressed forwards. The parts which are carried by the flange of sleeve 9 are then pushed along the threaded bolts 8, the springs 10 being simultaneously subjected to tension, whereas the electrode is locked by the catches 27 arranged on the lower rack 20 and comes into contact with the objects to be spot-welded, the arc thus being initiated and instantaneous welding taking place. The ignition time of the arc can be selected as required by the operator. It can also be governed by a timing circuit in the electric-arc welding apparatus.

When the welding operation has been ended, the pistol is removed from the spot-welded body, the flange and its parts as well as the upper rack 21 being returned to the original position by the springs 10. In this case, the electrode carrier - and hence the electrode - is moved forwards by the same distance as it was previously moved backwards, so that the electrode tip is ready in the chamber 14b for the next operating step. After a series of spot-welding operations, the driver 25 arrives at the untoothed part of the rack so that the electrode carrier is not pushed further forwards. The electrode is practically consumed. The remainder is taken out of the claws of the carrier 31, a new electrode is inserted and the driver 25 is then moved back along the racks to the starting position. During the spot-welding operation the chamber 14b is closed by a plane end face 14a and the asbestos disk 15. The welder can therefore work without protective goggles. Moreover, the welding point is kept free of oxidising air. The electrode ash is deposited only to a slight extent on the wall of the chamber 14b, so that cleaning work is necessary only after a relatively large number of welding operations.

We claim:

1. A semi-automatic spot welder apparatus comprising a longitudinally extending pistol-shaped casing having a forward end, a hollow welding head, means adjustably securing said welding head to the forward end of said casing, an electrode holder longitudinally displaceable in said casing, means for securing a welding rod to said electrode holder, means associated with said casing for insulating said electrode holder from said casing, said casing having a hand-grip portion, and a switch in said hand-grip portion for connecting said electrode holder to an electrical current source, a disk secured to said casing's forward ends, a plurality of spaced bolts secured to said disk and extending outwardly of said casing longitudinally thereof, a plurality of springs on said respective bolts, biasing said welding head away from said disk, a first saw tooth rack with oppositely directed teeth, positioned above said first rack, a U-shaped driver secured to said electrode holder, said driver having slotted catches therein for alternate engagement with either of said first and second racks, said hollow welding head being formed with a flange provided with an adjustable knurled nut for limiting the adjustment of said plurality of spaced bolts.

2. Apparatus as claimed in claim 1, wherein said welding head is formed with an inner cylindrical hollow portion for spacedly receiving an electrode therethrough and a forward outwardly tapered portion terminating in a flat annular face for shielding from view an electrical ark formed during welding.

* * * * *